Oct. 28, 1941.        A. BONI ET AL        2,260,552
PROJECTION APPARATUS
Filed Dec. 30, 1939        3 Sheets-Sheet 1
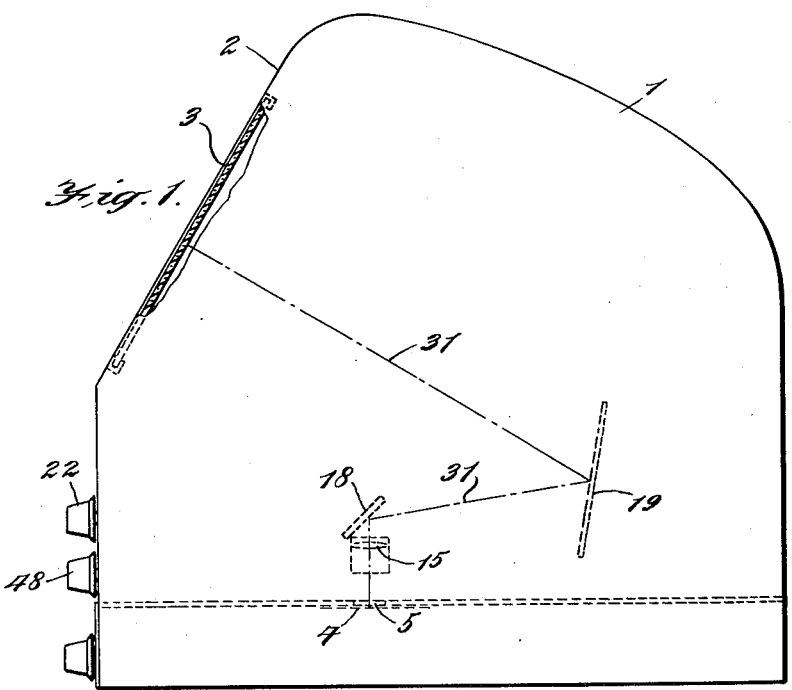
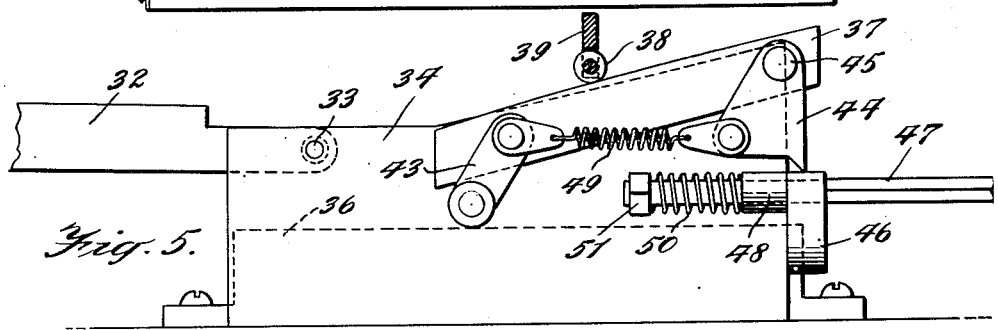
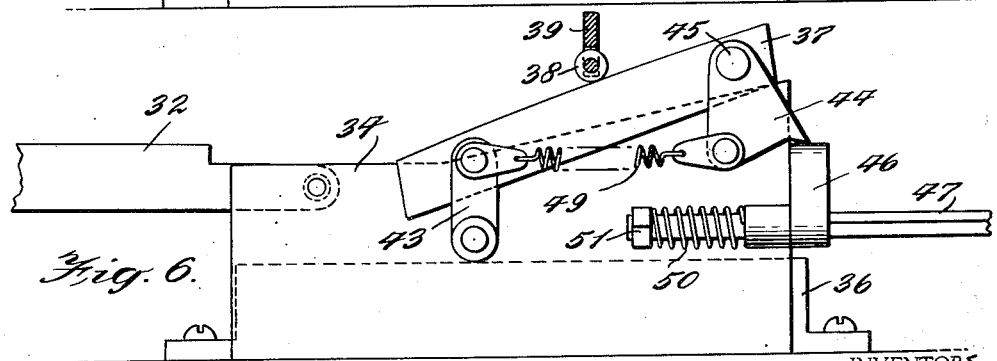

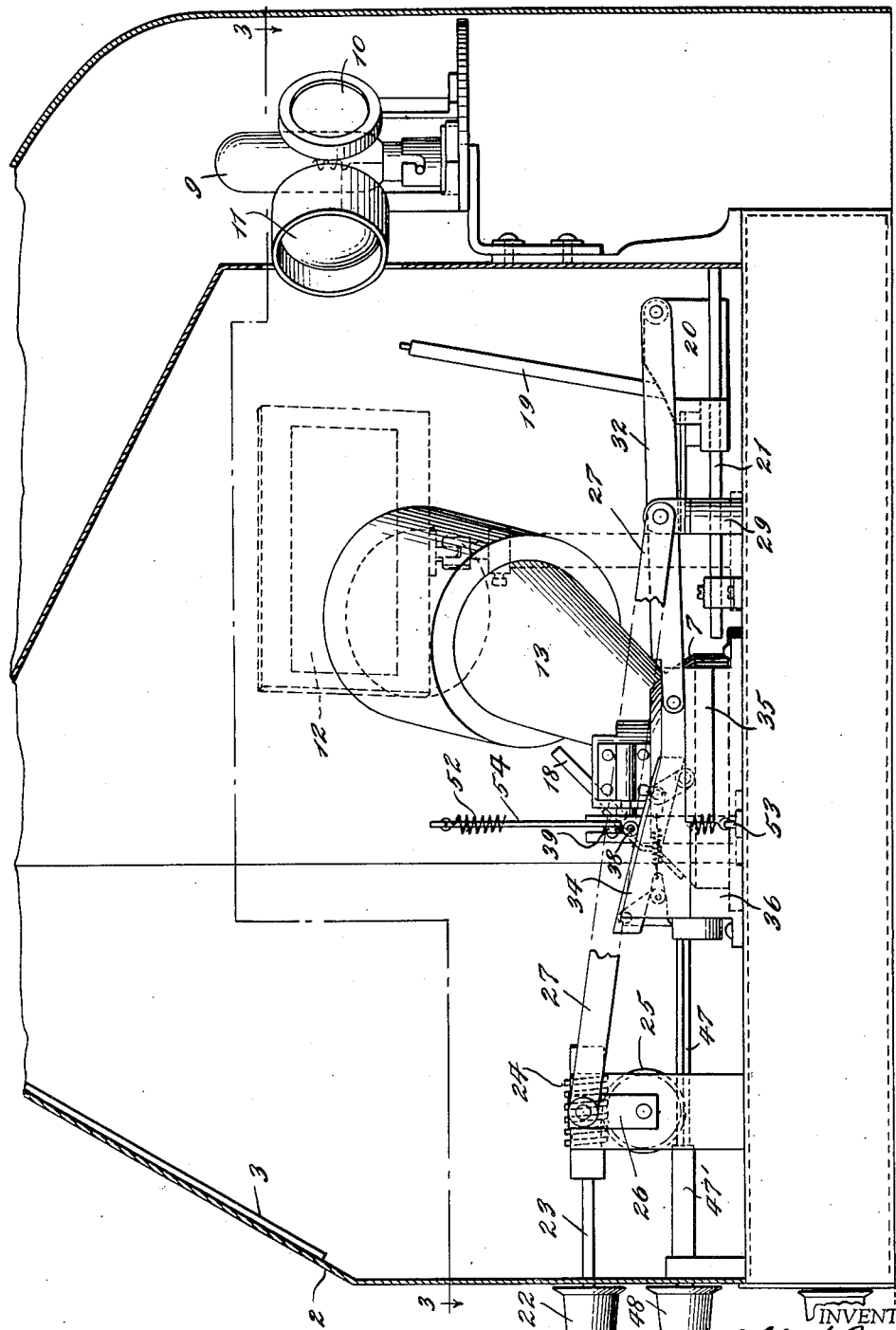

Oct. 28, 1941.　　　A. BONI ET AL　　　2,260,552
PROJECTION APPARATUS
Filed Dec. 30, 1939　　　3 Sheets-Sheet 3
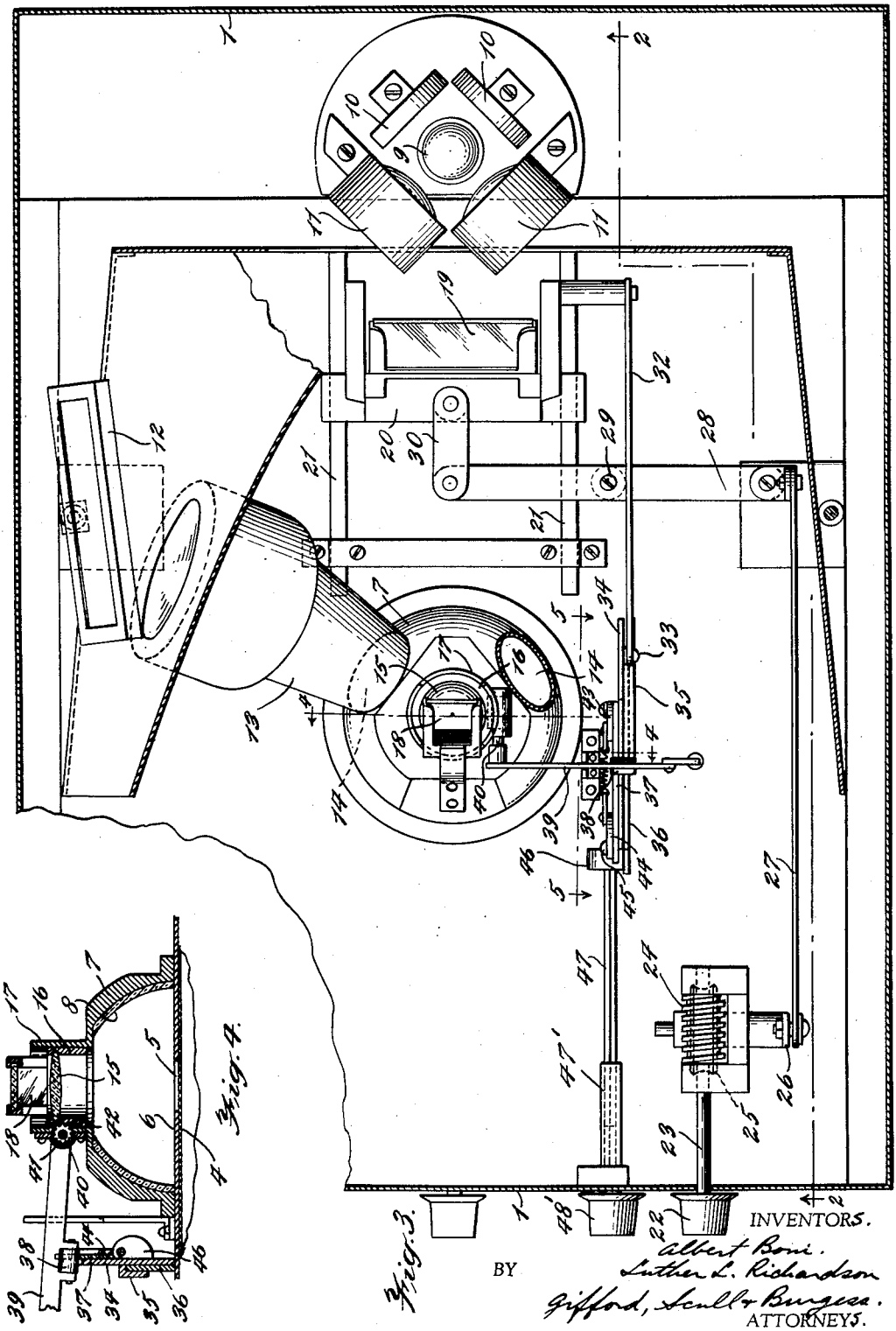

Patented Oct. 28, 1941

2,260,552

UNITED STATES PATENT OFFICE 2,260,552

PROJECTION APPARATUS

Albert Boni, New York, N. Y., and Luther L. Richardson, Darien, Conn., assignors to Readex Microprint Corporation, New York, N. Y., a corporation of Delaware Application December 30, 1939, Serial No. 311,786

5 Claims. (Cl. 88—24)

This invention relates to a novel and improved form of projection apparatus, the novel features of which will be best understood from the following description and the annexed drawings, in which we have shown a selected embodiment of the invention and in which:

Fig. 1 is a vertical elevation of a projection apparatus embodying our invention and showing certain parts diagrammatically;

Fig. 2 is a vertical sectional view through the apparatus shown in Fig. 1 but taken on an enlarged scale approximately on the line 2—2 of Fig. 3;

Fig. 3 is a view taken approximately on the line 3—3 of Fig. 2;

Fig. 4 is a view taken approximately on the line 4—4 of Fig. 3;

Fig. 5 is a view on an enlarged scale taken approximately on the line 5—5 of Fig. 3;

Fig. 6 is a view of the same structure as in Fig. 5, but showing certain parts in different positions.

The apparatus is shown as contained in a casing 1 of any suitable form, but herein shown as having a rearwardly inclined wall 2 at the front of the casing in which is disposed a projection screen 3 which is translucent so that an image may be projected thereon and viewed from the front of the casing. The object to be projected on the screen may be an opaque object on a sheet 4 (Fig. 4), a part of which may be disposed at a fixed projection position illustrated by an aperture 5 in a plate 6.

The projection position may be substantially covered by a spherical hood 7 having a reflecting surface 8 on the inside thereof, in a manner more fully disclosed in the copending application of Albert Boni and George Goldberg, Ser. No. 301,687, filed October 28, 1939. The object at the position 5 may be illuminated by a lamp 9 behind which are two reflectors 10 which direct light through condensers 11 to mirrors, one of which is shown at 12, and thence through hoods, one of which is shown at 13 and which are arranged to direct light through openings 14 in the hood 7.

Light reflected from the object at the projection position 5 and which strikes the reflecting surface 8 will be reflected back towards the object, and that light, together with other light reflected from the object, will be caught by a lens 15 in a lens mount 16 in the top of the dome 7. For purposes which will appear presently, the lens mount is vertically movable in a vertically extending flange 17, shown as forming part of the dome.

Rigidly secured to the mount so as to move with the mount and the lens 15 is a mirror 18 disposed at such an angle to the vertical axis of the lens 15 that it will catch the beam of light formed by that lens and deflect it rearwardly to a reflector 19, which in turn will reflect it to the screen 3. The size of this mirror will determine the size of the image projected on the screen.

By the above arrangement it will be seen that an image of the object exposed at the projection position will be projected upon the screen 3 where it may be viewed by an observer. We contemplate that the projection apparatus will be used primarily with the projection of microprints or other small objects, for example microprints of pages from a book. Individual observers will want to vary the magnification of the object on the screen, either to increase or to decrease the size of the image and for that purpose we mount the reflector 19 on a carriage 20 which slides on rails 21 extending forwardly and rearwardly of the casing.

It will be seen that as this carriage slides on the rails it will move towards or away from the projection position and at the same time will move towards or away from the screen. As it moves towards the projection position and screen, it will shorten the path of the beam of light from the lens 15 to the screen, whereas when it moves away from the projection position and the screen it will increase the length of that path. In the first instance, of course, it will decrease the magnification and in the latter case it will increase the magnification, since the beam of light, as it follows the path from the lens 15 to the screen 3, constantly increases in size, as known in the art.

Movement of the carriage may be caused by turning a handle 22 on the front of the casing, this handle being mounted on a shaft 23 to which is secured a worm 24 meshing with a worm gear 25 on which is a crank 26 pivoted to a link 27 at one end thereof. The other end of the link is pivoted to one end of the lever 28, which is fulcrumed intermediate its ends at 29 on a fixed part of the projector. The other end of the lever 28 is pivoted to a link 30, which is also pivoted to the carriage 20, as plainly shown in Fig. 3.

By the above described arrangement it will be seen that turning of the handle 22 will cause the reflector 19 to move forwardly or rearwardly in the casing, forwardly being considered as towards the screen and projection system, and rearwardly being considered as away therefrom.

In some instances the adjustment described above may be sufficient for varying the magnification, but it is desirable that the center line of the beam, which is indicated in dot and dash lines at 31 in Fig. 1, should be maintained at substantially the center of the mirror 18, reflector 19, and screen 3, in all positions of the reflector 19. Accordingly, we provide means for automatically adjusting the position of the mirror 18 simultaneously with adjustment of the reflector 19 and by such an amount as to maintain the center line 31 of the beam substantially at the centers of the mirror 18 and reflector 19 and also the center of the screen 3. This is accomplished by the following arrangement.

Pivoted to the carriage 20 is a link 32, the forward end of which is pivoted at 33 to a slide 34 having on the back thereof a guideway 35 engaging a fixed guide 36 (Figs. 4, 5, and 6), so that as the carriage 20 moves forwardly or rearwardly the slide 34 will move in the same direction and by the same amount.

On the slide is disposed a cam 37, the upper surface of which engages a roller 38 on an arm 39 which is pivoted on the flange 17 by being secured to a shaft 40 rotatably mounted on that flange. This shaft 40, as best shown in Fig. 4, carries a pinion 41 engaging a rack 42 on the lens mount 16.

By the above arrangement it will be seen that as the slide 34 moves with the carriage 20 and reflector 19, the wedge will lift the arm 39 or permit it to drop and this movement of the arm will cause rotation of the shaft 40 and consequently a raising or lowering of the lens mount with the lens 15 and the mirror 18. This slight movement of the lens will maintain the proper focus of the image on the screen 3 and will also maintain the center line 31 in correct relation to the mirror 18, reflector 19, and screen 3, during movement of the reflector 19.

While the above adjustment will be enough for most purposes, nevertheless we have provided an additional fine adjustment of the lens mount which may be used for focusing purposes if desired. This adjustment may be performed by making the cam 37 adjustable, as best shown in Figs. 5 and 6, where it is shown that the cam is pivoted to the slide 34 by means of a short link 43 near one end of the cam. The other or high end of the cam is provided with a dog 44 pivoted to the cam at 45 and engaging a cam 46 on a shaft 47 which rotates in a bearing 48 on the slide and in another bearing in the front wall of the casing, through which it extends, the front end of the shaft being provided with a handle 48' whereby it may be rotated.

The dog 44 is held in engagement with the cam 46 by means of a spring 49, as shown in Figs. 5 and 6, and the shaft 47 and cam 46 will move with the slide 34. As the slide 34 moves towards the left of Fig. 5, the bearing 48 on the slide acts through a spring 50 against a head 51 on the shaft 47 to cause that shaft and the cam 46 to move in the same direction, whereas when the slide moves towards the right of Fig. 5 the bearing 48 will engage the cam 46 and move the cam and shaft to the right. Therefore it will be seen that the cam 46 is always in correct position to act upon the dog 44, regardless of the position of the slide 34. In order to provide for a sliding movement of the shaft 47 without disturbing the position of the handle 48' on the front of the casing, the shaft 47 is made in two parts, the forward part 47' being in the form of a collar keyed or otherwise secured to the main shaft 47 so that the two parts may move lengthwise with respect to each other, but still will rotate together.

The arm 39 is held down where the roller 38 will engage the cam or wedge 37 as by means of a spring 52, which is secured to a fixed part 53 and to a rod 54 secured to the arm 39.

While for purposes of illustration and convenience in definition we have referred to various elements by certain names, it is to be understood that those names are not used in a limiting sense. For example, the mirror 18 and reflector 19 are merely examples of suitable means for deflecting a beam of light to cause it to follow the desired path. It is known in the art that prisms, for example, may be used in place of mirrors. In short, while we have shown and described the invention as being embodied in a certain specific form, nevertheless we do not intend to limit ourselves except by the appended claims.

We claim:

1. In a projection apparatus, a fixed screen, a fixed exposure position, means to illuminate an object at said position, a lens arranged to collect light from said object and form it into a beam, a reflector, a mirror connected to said lens and arranged to deflect said beam to said reflector, said reflector being arranged to reflect said beam to said screen, means to adjust said reflector to lengthen or shorten the path of the beam between the object and the screen, a lens mount supporting said lens and mirror and movable towards or away from said position, a slide adjacent said mount and connected to said reflector to move therewith, a cam on said slide, a rack on said mount, a pinion engaging said rack, and an arm rotatable with said pinion and bearing against said cam.

2. In a projection apparatus, a fixed screen, a fixed exposure position, means to illuminate an object at said position, a lens arranged to collect light from said object and form it into a beam, a reflector, a mirror connected to said lens and arranged to deflect said beam to said reflector, said reflector being arranged to reflect said beam to said screen, means to adjust said reflector to lengthen or shorten the path of the beam between the object and the screen, a lens mount supporting said lens and mirror and movable towards or away from said position, a slide adjacent said mount and connected to said reflector to move therewith, a cam pivoted on said slide, means actuated by said cam to move said mount, and means to move said cam on its pivot to move said mount while the slide is stationary.

3. In a projection apparatus, a fixed screen, a fixed exposure position, means to illuminate an object at said position, a lens arranged to collect light from said object and form it into a beam, a movable lens mounting adapted to move along the optical axis of said lens, a reflector, a mirror on said lens mounting arranged to deflect a beam from said lens to said reflector, said reflector being arranged to reflect said beam to said screen, a movable carriage for supporting said reflector, means to move said carriage and reflector toward and away from said mirror and screen, and means to simultaneously move said lens mounting along the optical axis of said lens to adjust said mirror and lens mounted thereon to maintain the center of said beam substantially at the center of both mirror and reflector.

4. In a projection apparatus, a fixed screen, a fixed exposure position, means to illuminate an object at said position, a lens arranged to collect light from said object and form it into a beam, a movable lens mounting adapted to move along the optical axis of said lens, a reflector, a mirror connected to said lens mounting and arranged to deflect a beam projected through said lens to said reflector, a movable carriage for supporting said reflector, means to move said reflector carriage toward and away from said mirror and screen, means to simultaneously move said lens mounting to adjust said mirror by moving said lens support to maintain the center of the beam passing through said lens substantially at the center of both mirror and reflector, and means to adjust said mirror independently of said reflector.

5. In a projection apparatus, a fixed screen, a fixed exposure position, means to illuminate an object at said position, a reflector, a lens adapted to collect light from said object and direct it in a beam to said reflector, a movable mounting for said lens adapted to move along the optical axis of said lens, a movable support for said reflector, means for moving said reflector support toward and away from said screen and lens, thereby to shorten or lengthen the path of the beam between the object and the screen, and means connected to said reflector support for simultaneously moving said lens mounting.

ALBERT BONI.
LUTHER L. RICHARDSON.